United States Patent [19]

Guimont et al.

[11] Patent Number: 6,052,593
[45] Date of Patent: Apr. 18, 2000

[54] METHOD FOR FREQUENCY MODE VALIDATION FOR, FREQUENCY ASSIGNMENT FOR, AND EVALUATING THE NETWORK EFFECT OF A FREQUENCY PLAN REVISION WITHIN A DUAL MODE CELLULAR TELEPHONE SYSTEM

[75] Inventors: Vincent Guimont, Blainville; Sylvain Briere, Laval; Daniel Dufour, Blainville, all of Canada

[73] Assignee: Telefonaktiebolaget L M Ericsson, Stockholm, Sweden

[21] Appl. No.: 08/852,879

[22] Filed: May 8, 1997

[51] Int. Cl.[7] ........................................... H04Q 7/20
[52] U.S. Cl. .......................... 455/446; 455/450; 455/452
[58] Field of Search .................................... 455/446, 434, 455/450, 452, 62, 552, 553, 511, 516, 437, 436, 411

[56] References Cited

U.S. PATENT DOCUMENTS

| | | | |
|---|---|---|---|
| 4,723,266 | 2/1988 | Perry | 455/446 |
| 4,914,651 | 4/1990 | Lusignan | 370/69.1 |
| 5,038,399 | 8/1991 | Bruckert | 455/54 |
| 5,111,534 | 5/1992 | Benner | 455/33.2 |
| 5,134,709 | 7/1992 | Bi et al. | 455/33.1 |
| 5,157,709 | 10/1992 | Ohteru | 379/58 |
| 5,365,571 | 11/1994 | Rha et al. | 379/59 |
| 5,404,574 | 4/1995 | Benveniste | 455/33.1 |
| 5,420,911 | 5/1995 | Dahlin et al. | 455/553 |
| 5,448,750 | 9/1995 | Eriksson et al. | 455/33.1 |
| 5,448,751 | 9/1995 | Takenaka et al. | 455/33.1 |
| 5,475,868 | 12/1995 | Duque-Anton et al. | 455/62 |
| 5,483,667 | 1/1996 | Faruque | 455/33.1 |
| 5,491,837 | 2/1996 | Haartsen | 455/62 |
| 5,504,939 | 4/1996 | Mayrand et al. | 455/450 |
| 5,507,034 | 4/1996 | Bodin et al. | 455/34.1 |
| 5,519,884 | 5/1996 | Duque-Anton et al. | 455/33.1 |
| 5,570,467 | 10/1996 | Sawyer | 456/515 |
| 5,898,928 | 4/1999 | Karlsson et al. | 455/450 |
| 5,905,955 | 5/1999 | Bamburak et al. | 455/455 |

FOREIGN PATENT DOCUMENTS

| | | |
|---|---|---|
| 0 585 994 | of 0000 | European Pat. Off. . |
| 0 610 645 | 2/1993 | European Pat. Off. . |
| 0 571 133 | 5/1993 | European Pat. Off. . |
| WO 96/12369 | 4/1996 | WIPO . |

*Primary Examiner*—Nguyen Vo
*Assistant Examiner*—Greta J. Fuller
*Attorney, Agent, or Firm*—Jenkens & Gilchrist, P.C.

[57] ABSTRACT

A frequency plan revision proposal is evaluated to determine whether it is compatible with the current cell configuration by insuring that sufficient frequencies having appropriate operating modes are available for assignment to meet the traffic and control channel requirements and availability of the included cell transceivers. A record is kept of previously approved proposals resulting in a revision to the frequency plan assignment. A determination is then made as to whether the current proposal if implemented would have an adverse effect on the network in view of the previously approved proposals maintained by the record. An adverse effect is found when: a sub-frequency group/frequency dropped and/or added by the proposal at issue matches or is adjacent to a sub-frequency group/frequency dropped and/or added in the record of the previously approved proposals; and the distance between the cell of the proposal at issue and the cell of the previously approved proposal in the record are within a certain threshold distance of each other.

29 Claims, 6 Drawing Sheets

METHOD FOR FREQUENCY MODE VALIDATION FOR, FREQUENCY ASSIGNMENT FOR, AND EVALUATING THE NETWORK EFFECT OF A FREQUENCY PLAN REVISION WITHIN A DUAL MODE CELLULAR TELEPHONE SYSTEM

BACKGROUND OF THE INVENTION

1. Technical Field of the Invention

The present invention relates to cellular telephone systems and, in particular, to a method for assigning frequencies to transceivers in cells of a cellular telephone system supporting analog and/or digital communications channels.

2. Description of Related Art

Cellular telephone systems divide a large service area into a number of smaller discrete geographical areas called "cells" each typically ranging in size from about one-half to about twenty kilometers in diameter. Each cell is at least contiguous and/or overlapping with multiple adjacent cells to provide substantially continuous coverage throughout the service area. A base station including a plurality of transceivers capable of operating independently on different assigned radio frequencies is provided for each of the cells. Via the transceivers, the base stations engage in simultaneous communications with plural mobile stations operating within the area of the associated cell. The base stations further communicate via data links and voice trunks with a central control station, commonly referred to as a mobile switching center, which functions to selectively connect telephone calls to the mobile stations through the base stations and, in general, control operation of the system.

Each cell is assigned use of a predetermined set of frequencies from the cellular frequency band for use in providing its control and voice/data (traffic) channels. The assignment is typically made in accordance with a certain frequency plan. The frequencies used for the control and traffic channels assigned to a given cell are preferably spaced apart from each other across the frequency spectrum of the cellular frequency band. This serves to minimize the instances and adverse affects of adjacent channel interference.

Because only a limited number of frequencies are available in the cellular frequency band, the same frequencies that are assigned to one cell are also assigned to (i.e., reused by) other cells in distant parts of the service area. Typically, adjacent cells are not assigned to use the same frequency by the frequency plan. Furthermore, the power levels of the signal transmissions on any given frequency are limited in strength so as to limit propagation beyond the cell area. The foregoing precautions serve to reduce instances of co-channel interference caused by reuse of that same frequency in a distant cell. It is further noted that careful power level and distance assignment also assists in reducing instances of adjacent channel interference.

In spite of the precautions taken by service providers in the frequency plan assignment for a frequency reuse cellular telephone system and in the regulation of system operation, it is known that instances of co-channel interference do occur. This interference may be affected by a number of factors including: terrain irregularities; radio propagation changes; fading; multipath propagation; reflection; existence of human and natural obstructions; the number of available transceivers per cell; and variations in demand. This interference often adversely affects system operation by, for example, degrading voice quality on the traffic channels or interfering with the transmission and reception of control signals on the control channels. Service providers accordingly monitor on a cell by cell basis for instances of adjacent channel and co-channel interference on the assigned frequencies, as well as for instances of relatively low interference on other frequencies, and in response thereto make requests for a revision in the frequency plan assignment of frequencies for that cell. Such a revision is often referred to in the art as a "proposal" for change.

Now that both digital, analog and dual mode systems are being implemented, the process for making and implementing a request for a revision in the frequency plan assignment is becoming more complicated. The primary reason for the added complication relates to the fact that certain frequencies in the cellular frequency band may be specified solely for use with analog control or traffic channels, while other frequencies are specified solely for use with digital control or traffic channels. Still other frequencies in the cellular frequency band may be specified for dual mode use. At the same time, the transceivers comprising the cell configuration of a cell may be assigned for either analog or digital control/traffic channel use. The heart of the problem resides in the fact that mode authorizations for the frequencies included in the proposal may not necessarily coincide with the mode capabilities of the transceivers. Accordingly, it is imperative that any revision in the frequency plan assignment take into account the specified modes of the frequencies within the proposal in the context of the specified operating modes of the transceivers for the cell configuration. Another problem lies in the fact that each cell evaluates interference, and makes requests for frequency plan assignment revisions by considering only its own needs, and failing to consider the effect of such assignment revisions on other cells within the network.

What is needed then is a method that validates from a frequency mode perspective the frequencies of a given proposal in view of the transceiver mode requirements of a given cell, and further coordinates the cell based requests for revision to the frequency plan assignment to the benefit of the each of the cells of the network rather than the benefit of just an individual cell.

SUMMARY OF THE INVENTION

To address the foregoing and other concerns, the present invention evaluates a proposal for a revision in the frequency plan assignment to determine whether it is compatible with the current cell configuration of the cell making a request for the revision. In this regard, the frequencies of the proposal are evaluated to ensure that sufficient frequencies having appropriate operating modes (analog, digital, and the like) are available to meet the traffic channel requirements of the included cell transceivers. The frequencies of the proposal are further evaluated to ensure that they can support the control channel (analog and/or digital) requirements of the cell.

In yet another aspect of the present invention, a procedure is provided for the assignment of frequencies from the proposal to the included cell transceivers for the current cell configuration. In a first step, the frequencies for the control channels (analog and/or digital) are assigned to the control channel transceivers. In a second step, the remaining frequencies are assigned to the traffic channel transceivers. For the second step, the assignment is made in accordance with either: the top to bottom ordering of the frequencies; the bottom to top ordering of the frequencies; or, the least to most interfered frequencies.

The present invention further evaluates for network effect the individual cell proposals to revise the frequency plan assignment. Such revisions typically comprise the dropping one or more frequencies of a sub-frequency group in favor of the addition of one or more other frequencies of another sub-frequency group. A record is kept of previously approved revisions to the frequency plan assignment. A determination is then made as to whether a current proposal for a frequency plan revision conflicts with any of the previously approved proposals maintained by the record. A conflict is found when: the sub-frequency group dropped and/or added by the current proposal at issue matches or is adjacent to a sub-frequency group dropped and/or added in the record of the previously approved proposals; and a distance between the cell of the current proposal at issue and the cell of the previously approved proposal in the record is less than a certain threshold distance. Alternatively, a conflict is found if a frequency dropped and/or added by the current proposal at issue matches or is adjacent to a frequency dropped and/or added in the record of the previously approved proposals; and a distance between the cell of the current proposal at issue and the cell of the previously approved proposal in the record is less than a certain threshold distance.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

There are a plurality of radio frequencies in the cellular frequency band available to cellular telephone system providers for use in communicating with mobile stations. In an analog cellular telephone system, like the known advanced mobile phone service (AMPS) communications system, there is one frequency division multiple access (FDMA) analog communications (either control or traffic) channel per frequency. In a digital cellular telephone system, like the known D-AMPS or Global System for Mobile (GSM) communications systems, however, there are a plurality of time division multiple access (TDMA) digital communications channels (time slots) per frequency.

A cellular service area can cover a large geographic region, and in many instances there will be a need for a large number of cells. Often times, the number of cells needed exceeds the number of cells provided by dividing the available frequencies amongst the cells in such a manner as to handle expected subscriber usage per cell. In such a case there are simply not enough frequencies in the cellular frequency band for unique assignment to the included cells. In order then to provide sufficient call handling capacity throughout the service area, the cells are grouped into clusters of cells and the frequencies in the cellular frequency band are divided amongst and reused in each of the clusters in accordance with a certain frequency assignment plan.

Figure 1:
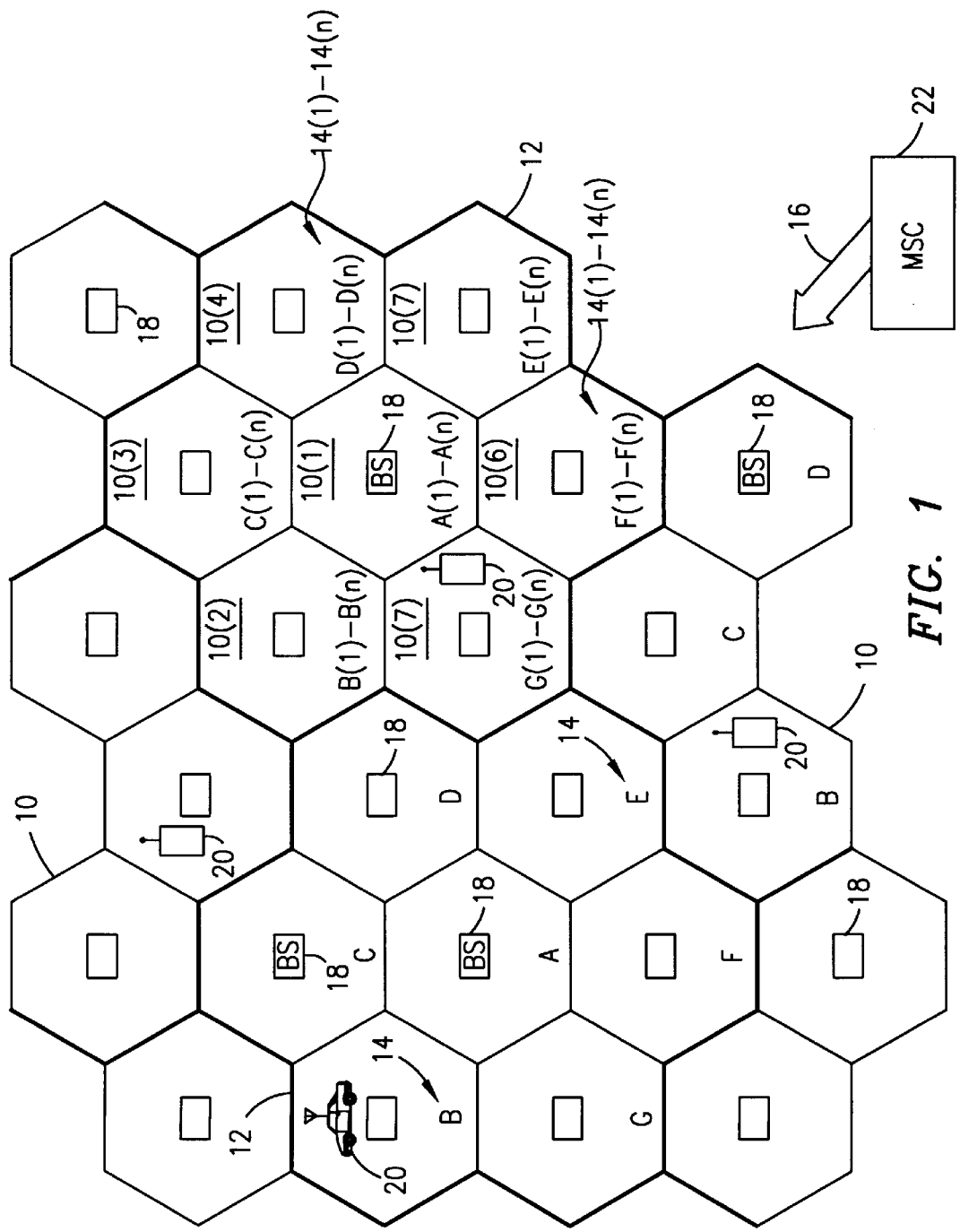
FIG. 1 is a cell diagram schematically illustrating an exemplary frequency plan assignment within a frequency reuse cellular telephone system.

Reference is now made to FIG. 1 wherein there is illustrated an exemplary cell structure and frequency plan assignment for use in a radio frequency reuse cellular telephone system. An arbitrary geographic region (hereinafter "the service area") is divided into a plurality of contiguous cells 10 schematically represented by hexagons. The cells 10 are then grouped into clusters 12 (outlined in bold to ease recognition). For example, in the frequency plan of FIG. 1, each cluster 12 includes seven cells 10(1)–10(7). It will, of course, be understood that each cluster 12 may have more or less cells 10 as required by the selected frequency plan.

The available frequencies in the cellular frequency band are divided in accordance with the frequency plan into frequency groups 14, with the frequency groups assigned amongst the cells 10 of each cluster 12 such that the radio frequencies of the cellular band are reused in each cluster. For example, in a cell structure having seven cells 10 per cluster 12 like that shown in FIG. 1, there are seven frequency groups 14 identified and differentiated from each other by the alphabetic labels "A" through "G" corresponding to the cells 10(1)–10(7), respectively. Thus, each cell 10(1) in the service area is assigned use of radio frequencies of the cellular band in frequency group A, each cell 10(2) is assigned use of radio frequencies of the cellular band in frequency group B, and so on up to each cell 10(7) being assigned use of radio frequencies of the cellular band in frequency group G. Furthermore, each frequency group 14 is divided into a plurality (n) of sub-frequency groups 14(1)–14(n). Thus, frequency group A includes sub-frequency groups A(1) through A(n), frequency group B includes sub-frequency groups B(1) through B(n), and so on up through the sub-frequency groups G(1) through G(n) of frequency group G.

It will be noted that in such a frequency plan, adjacent cells are typically not assigned use of the same frequency. Reuse of an identical frequency in the service area is preferably made with a separation of at least more than one cell 10 along with a regulation of broadcast power from each cell to constrain radio propagation substantially within the cell area. Furthermore, it will be noted that typically no one cell 10 utilizes adjacent frequencies in the cellular band. Adjacent frequencies are preferably assigned no closer than one cell 10 away from each other. By arranging the cells 10 in clusters 12 as shown in FIG. 1, regulating broadcast power of communications within the cell as mentioned above, and further by assigning frequencies in the fashion mentioned above, the likelihood of interference is reduced while simultaneously providing effective cellular communications services across a very large service area.

Each of the cells 10 in a cellular telephone system such as that illustrated in FIG. 1 includes at least one base station (BS) 18 configured to facilitate radio frequency communications with mobile stations 20 moving throughout the service area. The base stations 18 are illustrated as being positionally located at or near the center of each of the cells 10. However, depending on geography and other known factors, the base stations 18 may instead be located at or near the periphery of, or otherwise away from the centers of, each of the cells 10. In such instances, the base stations 18 may broadcast and communicate with mobile stations 20 located within the cells 10 using directional rather than omnidirectional antennas. The base stations 18 are connected by communications links (generally shown by arrow 16) to at least one mobile switching center (MSC) 22 operating to control the operation of the system for providing cellular communications with the mobile stations 20. Each base station 18 includes a plurality of transceivers (not shown) capable of operating independently on different radio frequencies assigned to the cell. Operation of the mobile switching center 22 and base station 18 to provide cellular telephone service is well known to those skilled in the art, and will not be described.

In spite of the precautions taken to avoid interference, it is known that interference does occur in cellular systems like that previously described. One aspect of this interference originates from adjacent frequency communications occurring simultaneously in cells 10 of the same or other clusters 12 (i.e., adjacent channel interference). Another aspect of this interference originates from same frequency communications occurring simultaneously in the cells 10 of other clusters 12 (i.e., co-channel interference). To combat this interference, the cellular service provider often engages in occasional revisions of the frequency plan wherein one or more frequencies (comprising sub-frequency groups 14(n) or frequency groups 14) assigned to a cell 10 are dropped in favor of the addition of one or more other frequencies (comprising sub-frequency groups or frequency groups) contained within the cellular band. In this regard, the frequencies (in a sub-frequency group 14(n) or frequency group 14) assigned by a current version of the frequency plan to a given cell comprise "selected" frequencies with respect to that given cell, and all other frequencies in the cellular band, which are normally selected frequencies for other cells, comprise "candidate" frequencies that could possibly be assigned to that given cell as a result of the revision in the frequency plan. The point of the revision then is to delete one or more of the selected frequencies (comprising sub-frequency groups 14(n) or frequency groups 14) for a cell which are interfered, and assign in place thereof a corresponding one or more un-interfered or less-interfered candidate frequencies (from other sub-frequency groups or frequency groups). In many cases, however, such a revision in the frequency plan with respect to a given cell 10 fails to take into consideration the effect the revision may have on other cells of the cellular telephone system.

Figure 2:
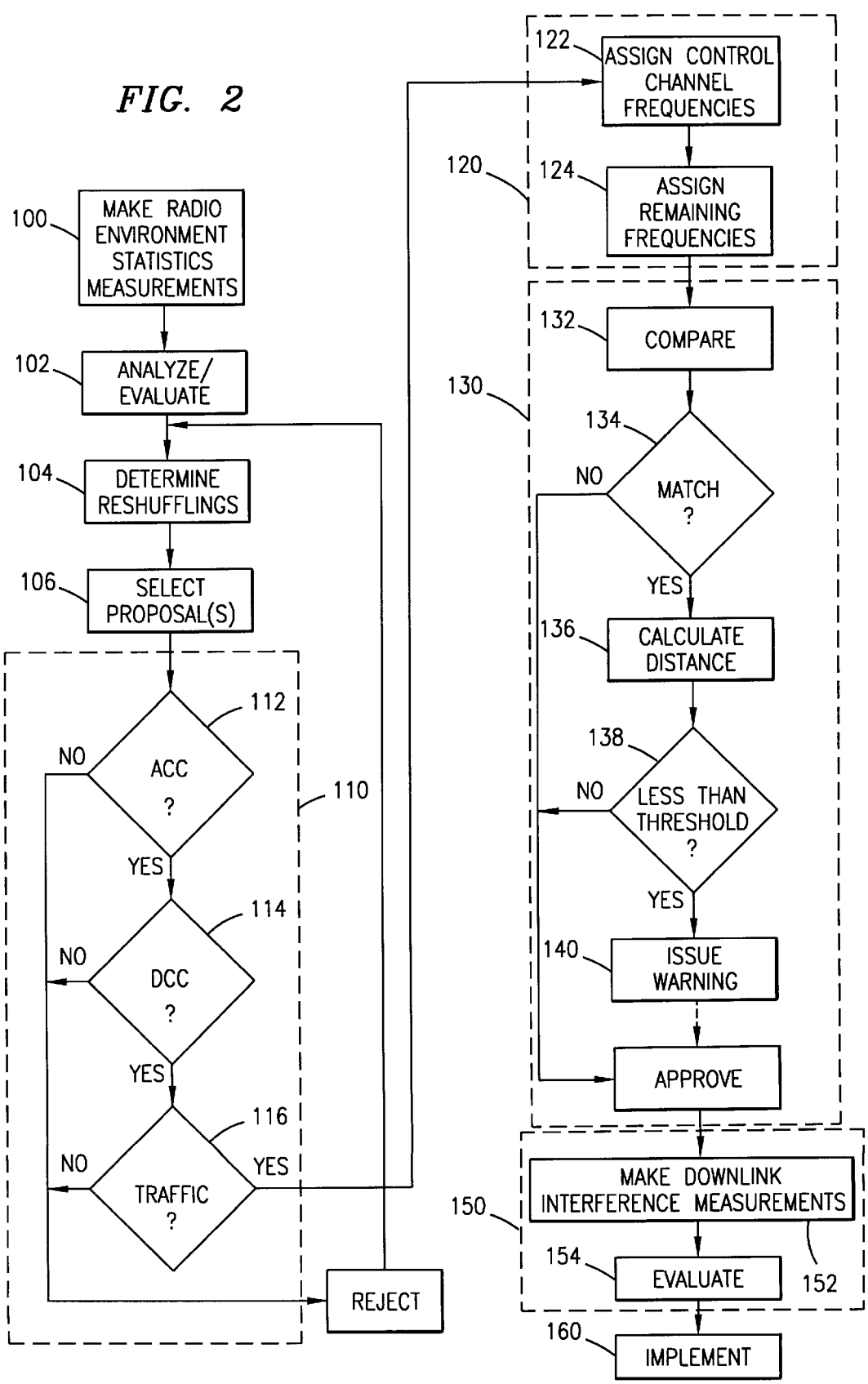
FIG. 2 is a flow diagram for a procedure of the present invention for effectuating a revision in a frequency plan for a cellular telephone system.

Reference is now made to FIG. 2 wherein there is shown a flow diagram for a procedure of the present invention to effectuate a revision in a frequency plan for a cellular telephone system. In step 100, radio environment statistics measurements are made with respect to each cell 10. These measurements, made on a cell by cell basis in accordance with known procedures, include a measurement of the interference on the uplink $I_{UP}$ (i.e., for mobile station 20 to base station 18 communications)for not only the selected frequencies for that cell, but also the candidate frequencies of that cell. The measurements further include a measurement with respect to the digital selected frequencies of the bit error rate on the uplink $BER_{UP}$, and the bit error rate on the downlink $BER_{DN}$ (i.e., for base station 18 to mobile station 20 communications). The uplink related measurements are made by the base stations 18 of each cell, and are reported to the mobile switching center 22. The downlink related measurements, on the other hand, are made by the mobile stations 20, and are reported to the mobile switching center 22 through the base stations 18.

Next, in step 102, the service provider/operator makes an analysis of the reported radio environment statistics measurements for a given cell 10. This analysis is typically referred to as an evaluation, and involves the calculation (either manual or automated), with respect to each sub-frequency group 14(n) containing selected frequencies, and each sub-frequency group containing candidate frequencies, of the average analog and digital uplink interference $I_{UP}$, average digital uplink bit error rate $BER_{UP}$, and average digital downlink bit error rate $BER_{DN}$ of the frequencies assigned thereto.

In step 104, the service provider/operator then uses the results of the evaluation (step 102) to determine a frequency plan reshuffling for a given cell 10. The determined reshuffling of step 104 typically comprises the removal of certain ones of the selected sub-frequency groups 14(n) which show an unacceptable combination of average uplink interference $I_{UP}$, average uplink bit error rate $BER_{UP}$, and/or average downlink bit error rate $BER_{DN}$, in favor of a replacement with certain ones of the candidate sub-frequency groups which show acceptable average uplink interference $I_{UP}$.

Many reshufflings may be determined and considered by the service provider/operator before settling in step 106 on one or more of the reshufflings. These chosen reshufflings of step 106 are commonly (and hereinafter) referred to as "proposals" for changes in the frequency plan of the cellular telephone system for a certain cell.

It is recognized that the frequencies within a sub-frequency group are typically used for only certain types of communications. Accordingly, each sub-frequency group is assigned with an operating permission tag defining the permitted types of communications for which the frequencies within the sub-frequency group may be used. For example, at a high level, the permission may relate to the permitted use of the frequencies within the sub-frequency group for certain modes of communication such as digital communications (i.e., digital control and/or traffic channels), analog communications (i.e., analog control and/or traffic channels), or dual mode communications (i.e., analog or digital). More precisely, the permission may permit additional or alternative use in connection with other modes of communication, such as facsimile transmission, cellular digital packet data (CDPD), asynchronous data transmission, and the like.

It is also recognized that most service providers/operators implement sectorized cells 10, and assign frequency groups (including sub-frequency groups) on a sector by sector basis. With frequency reuse, a corresponding frequency group is typically assigned to a correspondingly oriented sector in order to minimize the likelihood of interference. Accordingly, each frequency group is assigned with a tag relating to its orientation. This tag then identifies the preferred, but not necessarily required, sector orientation with which the frequency groups should be used.

It is still further recognized that certain frequencies are assigned for use with certain types of communications channels. For example, a frequency may be used in the cellular telephone system for an analog control channel (ACC). Another frequency may include a time slot dedicated for use as a digital control channel (DCC). Accordingly, each frequency is assigned with a tag specifying its channel assignment (e.g., ACC, DCC, analog traffic, digital traffic, or analog/digital traffic).

Continuing now with the procedure for effectuating a revision in a frequency plan for a cellular telephone system, each of the proposals 106 is submitted for frequency mode validation in step 110. The frequency mode validation step 110 determines whether the candidate sub-frequency groups within the proposal for a given cell 10 are valid (i.e., they fit) with respect to the current configuration of that cell and in particular it base station 18. It is remembered here that the base station 18 for each cell 10 includes a plurality of transceivers (not yet shown) capable of operating independently on different assigned radio frequencies and with a given mode. The number and operating capabilities of the included transceivers define the current cell configuration.

The frequency mode validation determination of step 110 involves first determining in step 112, whether the frequencies of the sub-frequency groups included in the proposal 106 include a frequency having a tag specifying its channel as an analog control channel. Note, however, that this is a requirement only if the current cell configuration specifies the use of an analog control channel. Next, in step 114, a determination is made as to whether the sub-frequency groups included in the proposal 106 include a digital control channel operating permission tag such that one of the frequencies therein either is specified, or could be specified, for use as a digital control channel. Note here that this is a requirement only if the current cell configuration specifies the use of a digital control channel. Finally, in step 116, a determination is made as to whether the sub-frequency groups included in the proposal 106 include traffic channels with operating permission tags (analog, digital, data facsimile, CDPD, and the like) that satisfy the operating mode requirements of the included transceivers within the current cell configuration. This step 112 may further confirm that the sub-frequency groups of the proposal 106 are approved for the sector orientations of the cell.

If the determination of either step 112, step 114 or step 116 is negative, then the proposal 106 is rejected. Otherwise, if the determination of each step 112, 114, and 116 is affirmative, then the proposal passes frequency mode validation testing.

Figure 3:
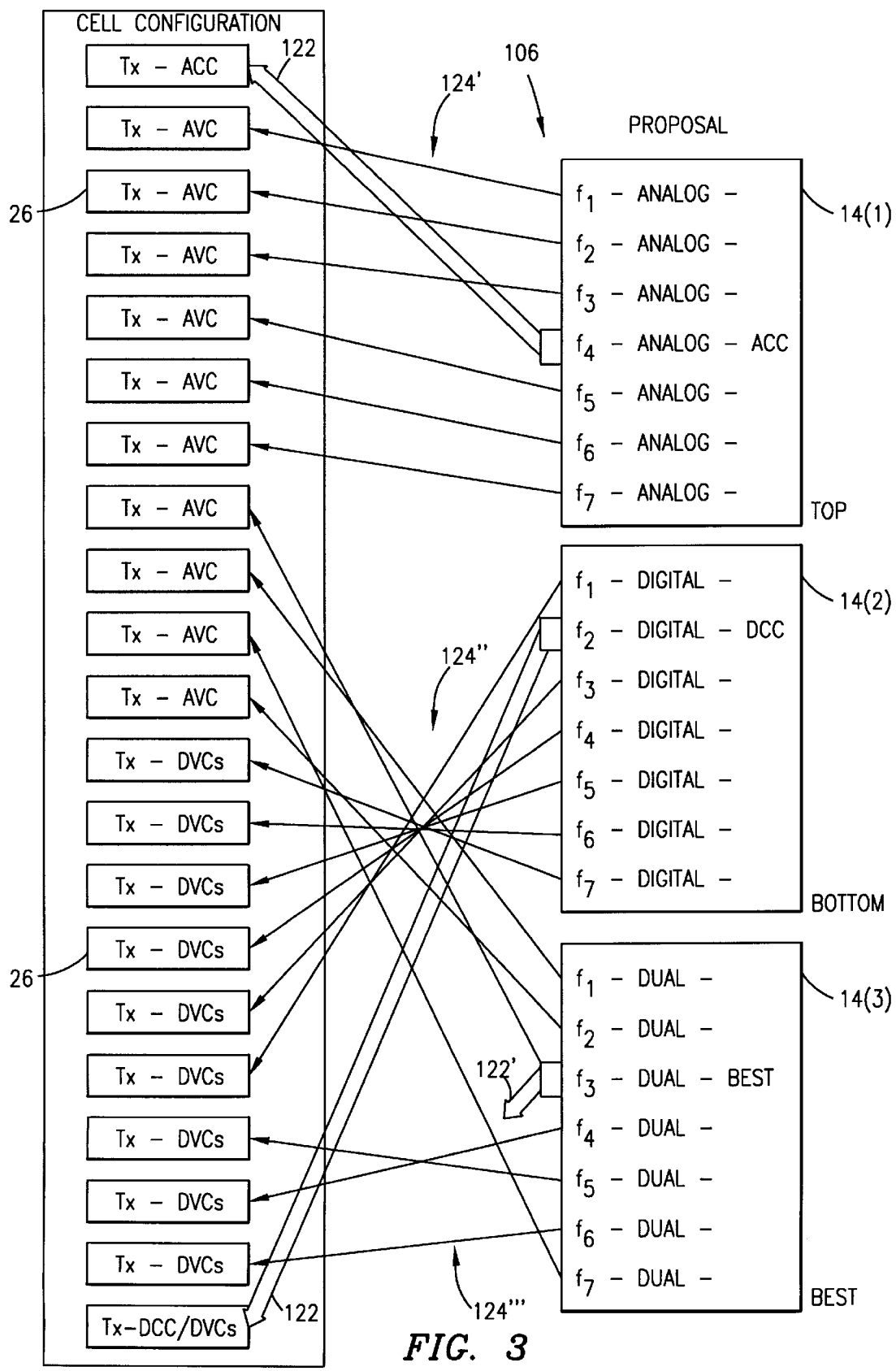
FIG. 3 is an illustration of an exemplary implementation of the frequency mode validation and automatic frequency assignment processes for the procedure of FIG. 2.

The operation of the frequency mode validation determination process (step 110) may be better understood by reference to a specific example illustrated in FIG. 3. On the left hand side of FIG. 3 is shown the current cell configuration for an exemplary cell including a plurality (twenty-one shown) of transceivers (TX) 26 providing an analog control channel (ACC), a plurality of analog voice (traffic) channels (AVCs), a plurality of digital voice (traffic) channels (DTCs), and a digital control channel (DCC). On the right hand side of FIG. 3 is shown a proposal 106 that is being considered. Three candidate sub-frequency groups 14(1)–14(3) are included in the proposal 106. Each sub-frequency group 14(1)–14(3) includes seven frequencies f1–f7. It will, of course, be understood that each sub-frequency group may have as many frequencies as is desired including as few as one.

The cell configuration includes a transceiver 26 providing an analog control channel (ACC). Accordingly, step 112 is executed to determine whether the frequencies of the sub-frequency groups 14(1)–14(3) included in the proposal 106 include a frequency having a tag specifying its channel as an analog control channel. In this case, the first sub-frequency group 14(1) has an operating permission tag of "analog", and one of its included frequencies $f_4$ is specified for use as an analog control channel ($f_{ACC}$).

The cell configuration includes a transceiver 26 providing a digital control channel (DCC). Accordingly, assuming that step 112 is passed, step 114 is executed to determine whether the frequencies of the sub-frequency groups 14(1)–14(3) included in the proposal 106 include a frequency having a tag specifying its channel for use as a digital control channel. In this case, the second sub-frequency group 14(2) has an operating permission tag of "digital", and one of its included frequencies $f_2$ is specified for use as a digital control channel ($f_{DCC}$) If none of the included frequencies f specifies use as a digital control channel, the process determines whether any of the frequencies within either a digital or dual sub-frequency group could be specified for use as a digital control channel. This is illustrated in FIG. 3 by identification of frequency $f_3$ in sub-frequency group 14(3) as the best frequency for potential use as a digital control channel ($f_{DCC}$).

The next step 116 of the frequency mode validation determination process determines whether the subfrequency groups 14(1)–14(3) included in the proposal 106 include enough traffic channels to match the operating mode requirements of the included transceivers 26. The current cell configuration requires ten analog traffic channels for the analog transceivers 26 and sufficient digital traffic channels for the ten digital transceivers. The process of step 116 identifies whether the proposal 106 includes sub-frequency groups 14(n) having operating permission tags sufficient to meet the cell configuration requirements. For example, if the three sub-frequency groups 14(1)–14(3) of the proposal 106 each had an operating permission tag of "analog" (not shown), the process of step 116 would be failed and the proposal rejected because the proposal could not satisfy the digital traffic channel needs of cell. Conversely, as shown, if the first sub-frequency group 14(1) had an operating permission tag of "analog", the second sub-frequency group 14(2) had an operating permission tag of "digital", and the third sub-frequency group 14(3) had an operating permission tag of "dual", the process of step 116 would be passed because the traffic channel needs of the cell could be met.

Figure 4:
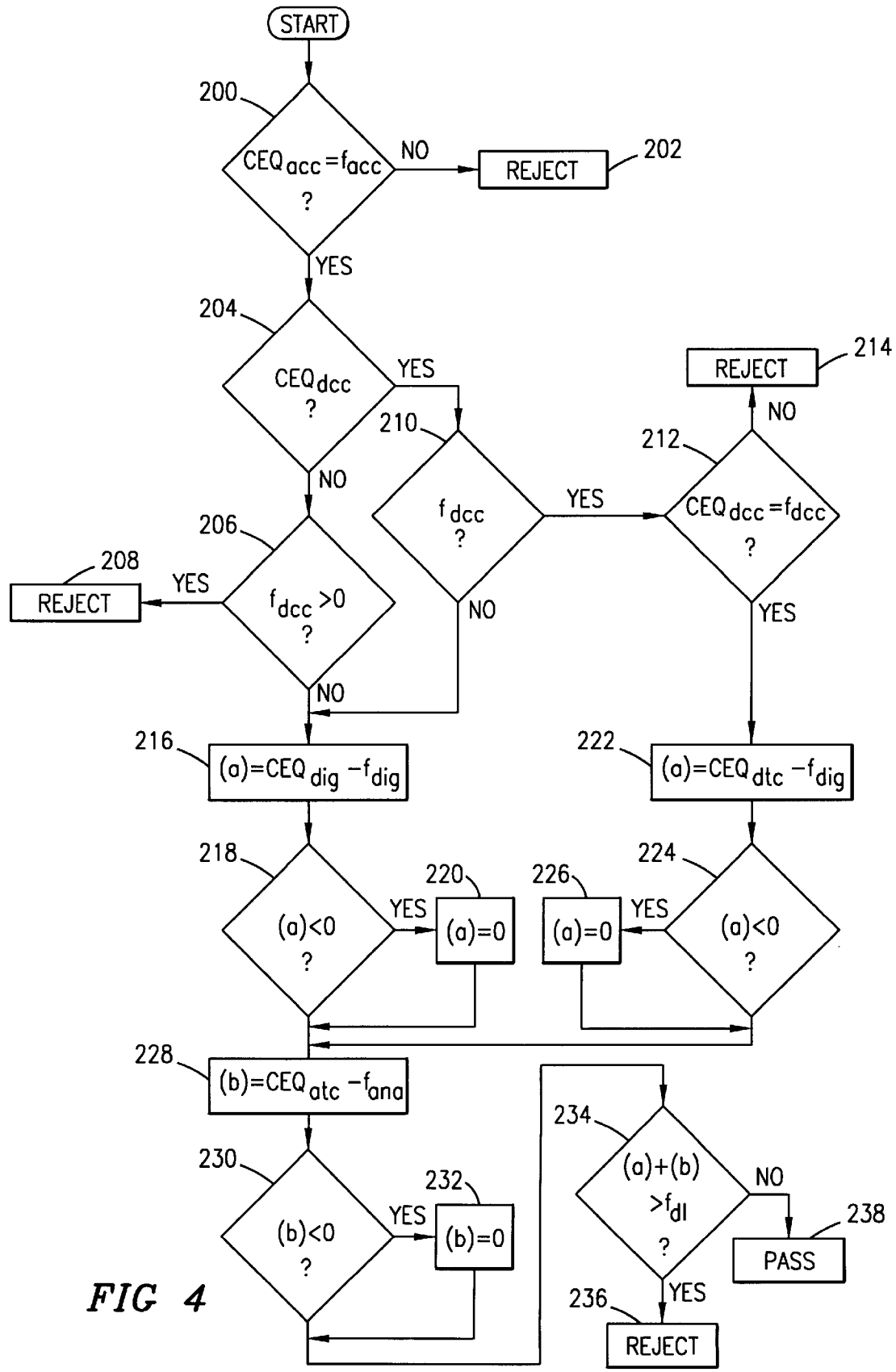
FIG. 4 is a flow diagram for a mathematical implementation of a frequency mode validation process.

The frequency mode validation process of step 110 may be mathematically represented and implemented as shown in the flow diagram of FIG. 4. The first step 200 is to determine whether the number of analog control channels (i.e., analog control channel specified transceivers) in the cell configuration ($CEQ_{acc}$) equals the total number of frequencies in the included sub-frequency groups of the proposal which have an analog control channel tag ($f_{acc}$). If not, the proposal is rejected in step 202. If yes, it is next determined in step 204 whether there are any digital control channels (i.e., digital control channel specified transceivers) in the cell configuration ($CEQ_{dcc}$). If no, a determination is made in step 206 as to whether there are any frequencies in the included sub-frequency groups of the proposal which have a digital control channel tag ($f_{dcc}$). If yes, the proposal is rejected in step 208.

If the determination of step 204 is affirmative (i.e., there is a digital control channel in the cell configuration), a determination is made in step 210 as to whether the cell configuration specifies a digital control channel tag ($f_{dcc}$). If yes, it is desirable to enforce this tag, and a determination is made in step 212 as to whether the number of digital control channels (i.e., digital control channel specified transceivers) in the cell configuration ($CEQ_{dcc}$) equals the total number of frequencies in the included sub-frequency groups of the proposal which have a digital control channel tag ($f_{dcc}$). If not, the proposal is rejected in step 214.

If the determinations of either step 206 or step 210 are negative, the procedure next moves to step 216 and calculates (a) which is the total number of digital specified transceivers ($CEQ_{dig}$) in the cell configuration minus the number of frequencies in the included sub-frequency groups of the proposal which have a digital operating permission tag ($f_{dig}$). If the result is negative (step 218), (a) is set equal to zero in step 220. If, on the other hand, the determination of step 212 is affirmative, the procedure instead moves to step 222 and calculates an alternative (a) which is the total number of digital traffic channel specified transceivers ($CEQ_{dtc}$) in the cell configuration minus the number of frequencies in the included sub-frequency groups of the proposal which have a digital operating permission tag ($f_{dig}$). If the result is negative (step 224), (a) is set equal to zero in step 226. Following the calculations of either steps 216–220 or steps 222–226, the procedure moves to step 228 to calculate (b) which is the total number of analog traffic channel specified transceivers ($CEQ_{atc}$) in the cell configuration minus the number of frequencies in the included sub-frequency groups of the proposal which have an analog operating permission tag (fana). If the result is negative (step 230), (b) is set equal to zero in step 232. The next step 234 is to determine if the sum of (a)+(b) is greater than the number of frequencies in the included sub-frequency groups of the proposal which have a dual operating permission tag ($f_{dl}$) and are capable of use as either a digital traffic channel or an analog traffic channel. If yes, the proposal is rejected in step 236. If no, the proposal passes (step 238) the frequency mode validation process of step 110.

Following rejection of proposal by the frequency mode validation process of step 110, the process returns to step 104 of FIG. 2 to make further reshufflings of the frequency groups and formation of selected proposals in step 106.

Reference is now once again made to FIG. 2. Next, automatic frequency assignment of the frequencies within the candidate sub-frequency groups is performed in step 120. The purpose of this procedure is distribute the frequencies within the candidate sub-frequency groups of the proposal 106 to the transceivers of the current cell configuration. The automatic frequency assignment process first assigns in step 122 the frequencies relating to the transceivers for the control channels for the cell. With respect to the analog control channel for the cell, the assigned frequency is the frequency in a sub-frequency group of the proposal 106 having a tag specifying its channel as an analog control channel. With respect to the digital control channel, the assigned frequency is the frequency in a sub-frequency group of the proposal 106 having a tag specifying support of a digital control channel. If no such frequency exists, then the best (e.g., lowest uplink interference $I_{UP}$) frequency having a digital (or perhaps dual) operating permission tag is selected. Next, in step 124, the remaining frequencies within the sub-frequency groups of the proposal 106 are assigned to the remaining transceivers for the cell. The order with which the assignments are made in step 124 is defined by a service provider/operator selected parameter. For example, the parameter may specify top, bottom or best for the assignment order. If top is specified, the frequencies are assigned from each sub-frequency group to a transceiver of the cell in accordance with their top to bottom numerical ordering within the sub-frequency group. If bottom is specified, the frequencies are assigned from each sub-frequency group to a transceiver of the cell in accordance with their bottom to top numerical ordering within the sub-frequency group. If best is specified, the frequencies are assigned from each sub-frequency group to a transceiver of the cell in accordance with the best (i.e., lowest uplink interference Iup) available frequency. Of course, the assignment performed in step 124 takes into account the operating permission tags of the sub-frequency groups from which the frequencies are taken in view of the specified type of operation for the cell transceivers. Furthermore, it is understood that this assignment is still at this point hypothetical in that it has not yet been physically implemented through a retune of the cell. It will, of course be understood that unlike that shown in the example, not all frequencies within a given sub-frequency group may be assigned.

The operation of the automatic frequency assignment process (step 120) may be better understood by reference again to the specific example illustrated in FIG. 3. In step 122, the frequencies f of the sub-frequency groups 14(1) and 14(2) specified for use as the analog control channel ($f_{ACC}$) and digital control channel ($f_{DCC}$) are assigned to the appropriate corresponding transceivers 26. If no digital control channel frequency ($f_{DCC}$) is specified in one of the sub-frequency groups 14(1)–14(3), the frequency within a sub-frequency group 14(n) having either a "digital" or "dual" operating permission tag, and having the best (i.e., lowest) uplink interference $I_{UP}$, is selected (step 122') for use as the digital control channel. Next, the remaining frequencies within the sub-frequency groups 14(1)–14(3) are assigned 124 to the remaining transceivers 26 of the cell configuration, taking into account the operating permission tags of the sub-frequency groups from which the frequencies are taken in view of the specified type of operation for the transceivers. The order with which this operation occurs may comprise one of three ways. First, as illustrated for purposes of this example in the context of sub-frequency group 14(1), the frequencies are assigned 124' to the transceivers 26 in accordance with their top to bottom numerical ordering within the sub-frequency group. Second, as illustrated for purposes of this example in the context of sub-frequency group 14(2), the frequencies are assigned 124" to the transceivers 26 in accordance with their bottom to top numerical ordering within the sub-frequency group. Third, as illustrated for purposes of this example in the context of sub-frequency group 14(3), the frequencies are assigned 124''' to the transceivers 26 in accordance with the best to worst (i.e., lowest to highest uplink interference $I_{UP}$) available frequency.

Figure 5:
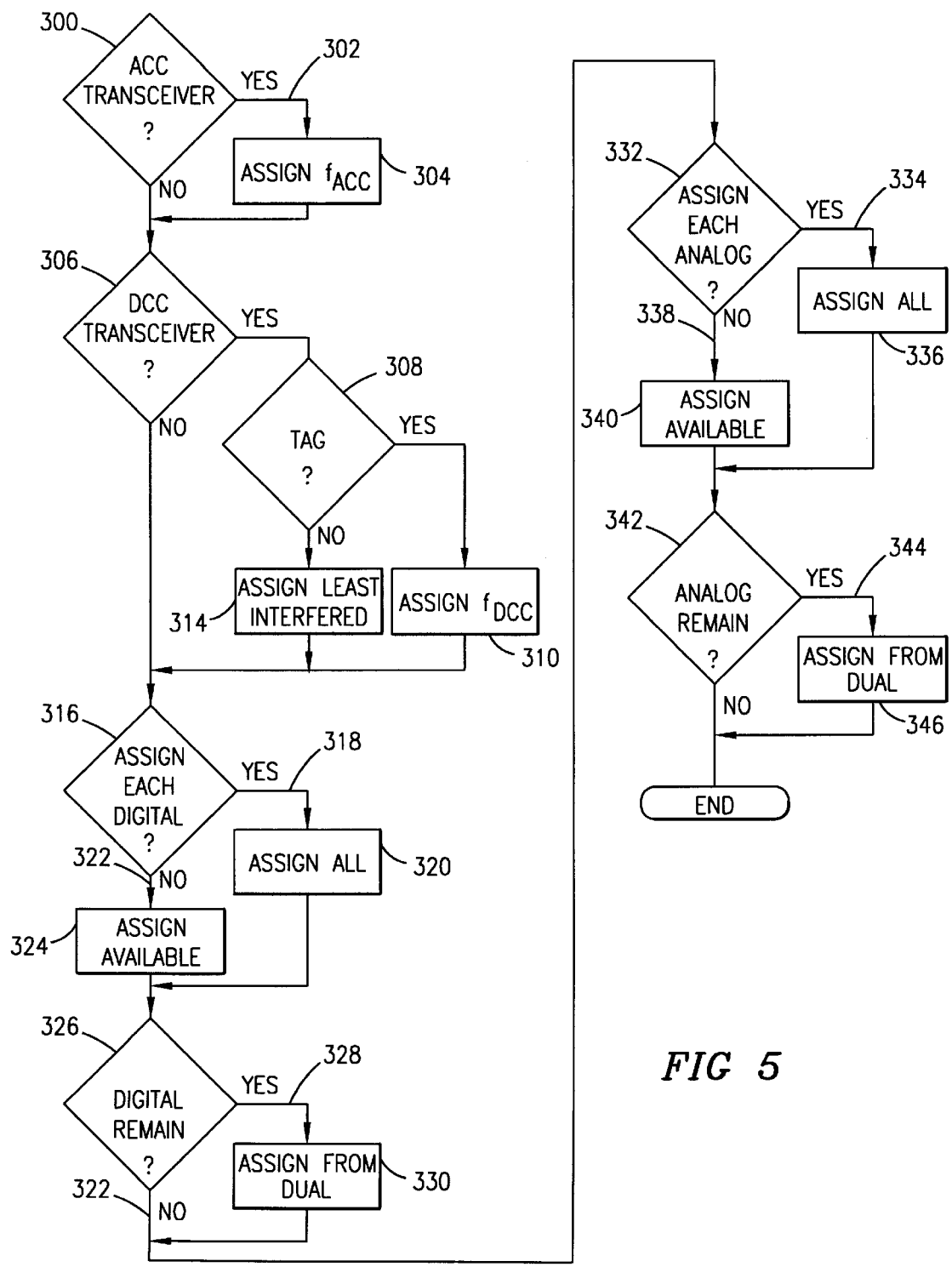
FIG. 5 is a flow diagram for an implementation of the automatic frequency assignment process.

A more detailed presentation of the automatic frequency assignment process of step 120 is shown in the flow diagram of FIG. 5. First, a determination is made in step 300 as to whether the cell contains a transceiver designated for analog control channel use. If yes (path 302), the frequency having a tag specifying its channel as an analog control channel ($f_{ACC}$) is assigned to that transceiver in step 304. Next, a determination is made in step 306 as to whether the cell contains a transceiver designated for digital control channel use. If yes, a determination is made in step 308 as to whether a frequency in the proposal has a tag specifying its channel for use as a digital control channel ($f_{DCC}$). If yes, that frequency is assigned to the digital control channel transceiver in step 310. If no, the best frequency from the least interfered of the sub-frequency groups having either a digital or dual operating permission tag is assigned to that transceiver in step 314. Next, the assignment step 124 of FIG. 2 is performed as follows. First, for each sub-frequency group having a digital operating permission tag, a determination is made in step 316 as to whether each transceiver designated for digital operation can receive a frequency from a sub-frequency group with a digital operating permission. If yes (path 318), these frequencies are assigned in accordance with the user specified order parameter (top to bottom, bottom to top, or best to worst) to the digital transceivers in step 320. If no (path 322), the frequencies of the sub-frequency group are assigned in accordance with the specified order to the available digital transceivers in step 324. Next, a determination is made in step 326 as to whether any digital transceivers remain which have not yet been assigned a frequency. If yes (path 328), frequencies are assigned to these transceivers from sub-frequency group(s) having a dual operating permission tag in step 330. If digital operation for the cell is preferred, this assignment is made from the least interfered of the dual mode sub-frequency groups. Otherwise, if analog operation is preferred, this assignment is made from the most interfered of the dual mode sub-frequency groups. Next, for each sub-frequency group having an analog operating permission tag, a determination is made in step 332 as to whether each transceiver designated for analog operation can receive a frequency from a sub-frequency group having an analog operating permission. If yes (path 334), these frequencies are assigned in accordance with the user specified order parameter (top to bottom, bottom to top, or best to worst) to the analog transceivers in step 336. If no (path 338), the frequencies of the sub-frequency group are assigned in accordance with the specified order to the available analog transceivers in step 340. Next, a determination is made in step 342 as to whether any analog transceivers remain which have not yet been assigned a frequency. If yes (path 344), frequencies are assigned to these transceivers from sub-frequency group(s) having a dual operating permission tag in step 346. If analog operation for the cell is preferred, this assignment is made from the least interfered of the dual mode sub-frequency groups. Otherwise, if digital operation is preferred, this assignment is made from the most interfered of the dual mode sub-frequency groups.

Reference is now again made to FIG. 2. Next, a network validation check is made in step 130 on the proposal 106 to determine whether any adverse consequences to the network might arise from an actual (i.e., physical as opposed to hypothetical) implementation of the proposal. The primary purposes of this procedure are to prevent two cells, within a certain definable distance, from substantially simultaneously implementing proposals 106 which would involve: a) a switch to the same sub-frequency group; b) a switch from the same sub-frequency group; c) a switch to adjacent sub-frequency groups; and d) a switch from adjacent sub-frequency groups. The additional purposes of this procedure are to prevent two cells, within a certain definable distance, from substantially simultaneously implementing proposals 106 where: e) one cell is switching from and the other cell is switching to the same sub-frequency group; f) one cell is switching to and the other cell is switching from the same sub-frequency group; g) one cell is switching from and the other cell is switching to adjacent sub-frequency groups; and, h) one cell is switching to and the other cell is switching from adjacent sub-frequency groups. To implement this procedure of step 130, a proposal 106 being made with respect to a certain cell is compared in step 132 against a record previously implemented proposals. The record stores these implemented proposals 106 back only for a certain defined time period. A test is then made in step 134 as to whether there are any entries in the record which have either: a "from" sub-frequency group identifier that is the same as or is adjacent to a "from" sub-frequency group identifier in the current proposal; a "to" sub-frequency group identifier that is the same as or is adjacent to a "to" sub-frequency group identifier in the current proposal; a "from" sub-frequency group identifier that is the same as or is adjacent to the "to" sub-frequency group identifier in the current proposal; or, a "to" sub-frequency group identifier that is the same as or is adjacent to the "from" sub-frequency group identifier in the current proposal. The foregoing description assumes that all of the cells in the service area are allocated frequency in accordance with the same process for identifying sub-frequency groups. In instances where similarly identified sub-frequency groups do not necessarily include the same frequencies, the test of step 134 determines whether there are any entries in the record which have either: a frequency in the identified "from" sub-frequency group that is the same as or is adjacent to a frequency in the identified "from" sub-frequency group in the current proposal; a frequency in the identified "to" sub-frequency group that is the same as or is adjacent to a frequency in the identified "to" sub-frequency group in the current proposal; a frequency in the identified "from" sub-frequency group that is the same as or is adjacent to a frequency in the identified "to" sub-frequency group in the current proposal; or, a frequency in the identified "to" sub-frequency group that is the same as or is adjacent to a frequency in the identified "from" sub-frequency group in the current proposal.

If the answer to the determination in step 134 is affirmative, then a calculation is made in step 136 of the distance between the cell of the current proposal 106 and the cell of the matching proposal in the record. The calculated distance is then compared in step 138 to a threshold distance. It should be noted here that in the instance of a layered cell structure, the threshold distance may be different for umbrella cells, micro cells and pico cells, or any combination thereof. Furthermore, different threshold distances may be specified for the same and adjacent sub-frequency group analyses. If the calculated distance is less than the threshold, the cells are too close to each other and a warning is issued in step 140 that the proposal 106 at issue may have adverse consequences to the network if implemented. It should be noted, however, that the warning may still be ignored, the proposal approved and a retune effectuated (as indicated with the dotted line arrow). Alternatively, operation may be implemented to automatically reject the proposal 106 if the distance is too close. If there is no match in step 134 or the distance is greater than the threshold in step 138, then the proposal 106 is approved by the network validation check. The proposal is then accepted and becomes a part of a record.

Figure 6:
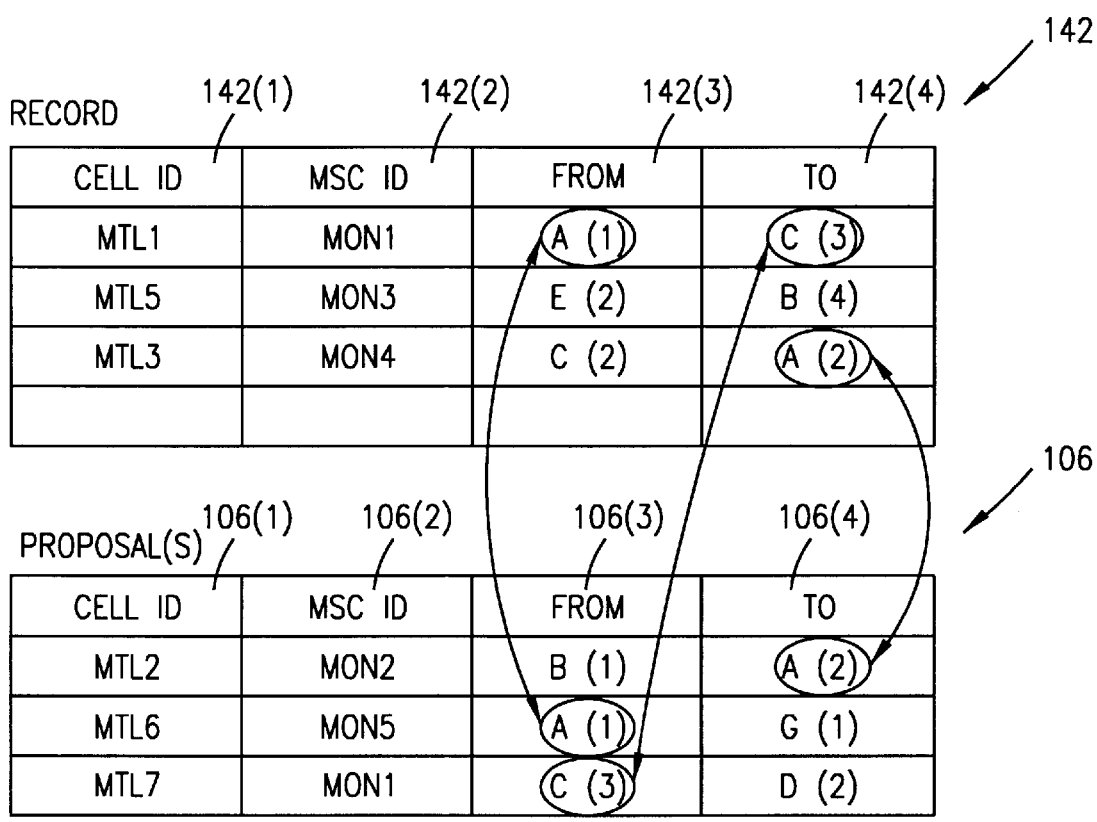
FIG. 6 is an illustration of an exemplary implementation of the network validation check process for the procedure of FIG. 2.

The operation of the network validation check process (step 130) may be better understood by reference to a specific example illustrated in FIG. 6. At the top of FIG. 6 is shown the record 142 of previously approved proposals. The record 142 indicates for each approved proposal, the identification 142(1) of the cell 10 which made the request, the identification 142(2) of the mobile switching center 22 to which that cell is assigned, the identification 142(3) of the sub-frequency group 14(n) from which a change was requested (i.e., the selected sub-frequency group that was dropped), and the identification 142(4) of the sub-frequency group 14(n) to which a change was requested (i.e., the candidate sub-frequency group that was added). The record may include other information of interest (not shown) such as an identification of the proposal 106 that resulted in the recorded change, the current status (i.e., planned, deployed, or the like) of the proposal, and the date of implementation.

In the present example, only three previously approved proposals are included in the record 142. The first previously approved proposal was made on behalf of cell 10 MTL1 belonging to mobile switching center 22 MON1 with respect to a change from sub-frequency group 14(n) A(1) to C(3). The second previously approved proposal was made on behalf of cell 10 MTL5 belonging to mobile switching center 22 MON3 with respect to a change from sub-frequency group 14(n) E(2) to B(4). The third previously approved proposal was made on behalf of cell 10 MTL3 belonging to mobile switching center 22 MON4 with respect to a change from sub-frequency group 14(n) C(2) to A(2).

At the bottom of FIG. 6 is shown the proposals 106 which previously passed steps 110 and 120, and are now being submitted for the network validation check of step 130. Like the record 142, the proposals 106 include an identification 106(1) of the cell 10 for which the proposal is being submitted, an identification 106(2) of the mobile switching center 22 to which that cell is assigned, an identification 106(3) of the selected sub-frequency group 14(n) that the proposal requests be dropped, and an identification 106(4) of the candidate sub-frequency group 14(n) that the proposal requests be added.

In the present example, three proposals 106 are currently under scrutiny with respect to the network validation check 130. The first proposal 106 is being made on behalf of cell 10 MTL2 belonging to mobile switching center 22 MON2 with respect to a change from sub-frequency group 14(n) B(1) to A(2). The second proposal 106 is being made on behalf of cell 10 MTL6 belonging to mobile switching center 22 MON5 with respect to a change from sub-frequency group 14(n) A(1) to G(1). The third proposal is being made on behalf of cell 10 MTL7 belonging to mobile switching center 22 MON 1 with respect to a change from sub-frequency group 14(n) C(3) to D(2).

The proposals 106 are taken up for consideration by the network validation check 130 on a first come, first served, basis. Other implementations for considering the proposal may alternatively be used. The comparison of step 132 first involves testing in step 134 whether there are any entries in the record 142 which have either: a "from" sub-frequency group identifier 142(3) that is the same as or is adjacent to a "from" sub-frequency group identifier 106(3) in the proposal at issue; a "to" sub-frequency group identifier 142(4) that is the same as or is adjacent to a "to" sub-frequency group identifier 142(4) in the proposal at issue; a "from" sub-frequency group identifier that is the same as or is adjacent to the "to" sub-frequency group identifier in the proposal at issue; or, a "to" sub-frequency group identifier that is the same as or is adjacent to the "from" sub-frequency group identifier in the proposal at issue. With respect to the first proposal 106 at issue, a match is found because its "to" sub-frequency group identifier 106(4) is the same as the "to" sub-frequency group identifier 142(4) of the third previously approved proposal stored in the record 142.

Again, it is recognized that this process example assumes that all of the cells in the service area are allocated frequencies in accordance with the same process for identifying sub-frequency groups. If this were not the case, the test of step 134 would instead determine whether there are any entries in the record which have either: a frequency in the identified "from" sub-frequency group that is the same as or is adjacent to a frequency in the identified "from" sub-frequency group in the current proposal; a frequency in the identified "to" sub-frequency group that is the same as or is adjacent to a frequency in the identified "to" sub-frequency group in the current proposal; a frequency in the identified "from" sub-frequency group that is the same as or is adjacent to a frequency in the identified "to" sub-frequency group in the current proposal; or, a frequency in the identified "to" sub-frequency group that is the same as or is adjacent to a frequency in the identified "from" sub-frequency group in the current proposal.

Having satisfied the test of step 134, a calculation is then made in step 136 of the distance d between cell 10 MTL2 (belonging to mobile switching center 22 MON2) and cell MTL3 (belonging to mobile switching center 22 MON4). If the distance d is less than a certain threshold (which may take into account layered cell structures) as determined in step 138, a warning is issued in step 140 that the proposal 106 at issue may have adverse consequences to the network if implemented.

With respect to the second proposal 106 at issue, a match is also found because its "from" sub-frequency group identifier 106(3) is the same as the "from" sub-frequency group identifier 142(3) of the first previously approved proposal stored in the record 142. A similar step 136 distance calculation and step 138 threshold comparison process is then performed with respect to cell 10 MTL6 (belonging to mobile switching center 22 MON5) and cell 10 MTL1 (belonging to mobile switching center 22 MON1). If the distance is less than the threshold, the warning will be issued. In accordance with the first come, first served processing, it will, of course, be understood, that if the first proposal were thereafter approved, it would be added to the record 142, and the process would have to take the first proposal into consideration when evaluating the second proposal.

With respect to the third proposal 106 at issue, a match is also found because its "from" sub-frequency group identifier 106(3) is the same as the "to" sub-frequency group identifier 142(3) of the first previously approved proposal stored in the record 142. A similar step 136 distance calculation and step 138 threshold comparison process is then performed with respect to cell 10 MTL7 (belonging to mobile switching center 22 MON5) and cell 10 MTL1 (belonging to mobile switching center 22 MON1). If the distance is less than the threshold, the warning will be issued. In accordance with the first come, first served processing, it will, of course, be understood, that if the first or second proposal were thereafter approved, it would be added to the record 142, and the process would have to take the first and/or proposal into consideration when evaluating the third proposal.

Approved proposals 106 are then submitted in step 150 for pre-update verification. It is noted that the radio statistic measurements made in step 100 and analyzed in step 102 for the purpose of evaluation (step 104) and proposal (step 106), fail to take into consideration the existence of interference on the downlink $I_{DN}$. Such interference should preferably be considered before making any changes in the frequency plan. Accordingly, the system requests mobile stations 20 to make downlink interference measurements (step 152) on each of the individual frequencies within the candidate sub-frequency groups for each of the approved proposal 106. The downlink interference measurements on these individual frequencies are preferably made by the mobile stations 20 in the normal course of operation where mobile assisted handoff (MAHO) measurements are made and reported. The uplink interference $I_{UP}$ and downlink interference $I_{DN}$ measurements with respect to the candidate sub-frequency groups are then evaluated in step 154 to either delete or confirm certain ones of the submitted proposals 106.

A proposal for a cell which is confirmed in step 154 is then implemented in step 160 to effectuate a retune of the transceivers in that cell to the frequencies which were assigned in the automatic frequency assignment process of step 120. Only one proposal per cell is confirmed. Any other proposals for that cell are then canceled (deleted).

It will be understood that any combination of the frequency mode validation (step 110), automatic frequency assignment (step 120) and/or network validation check (step 130) may be used as needed or desired. Thus, the steps 110, 120 and 130 may be used independently, partially or fully combined with each other.

Although the method and apparatus of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims.

What is claimed is:

1. A method for evaluating a proposal for a revision to a cellular frequency plan assignment for a given cell having a certain cell configuration of base station transceivers, the cell configuration further specifying at least one control channel, wherein the proposal to be evaluated identifies a plurality of sub-frequency groups to be used by the base station transceivers of the given cell for its operating frequencies, the method comprising the steps of:

determining whether the plurality of sub-frequency groups in the proposal include enough frequencies to satisfy the certain cell configuration of base station transceivers for the given cell;

determining whether the plurality of sub-frequency groups in the proposal include frequencies for use with the at least one control channel of the certain cell configuration; and rejecting base station transceiver frequency plan assignment proposals that fail to satisfy the foregoing determining steps.

2. The method as in claim 1 wherein the given cell comprises a dual mode analog/digital cell, and the step of determining whether the plurality of sub-frequency groups in the proposal include enough frequencies to satisfy the certain cell configuration of base station transceivers for the given cell comprises the step of determining whether the plurality of sub-frequency groups in the proposal include enough analog, digital or dual mode frequencies to satisfy the certain cell configuration of analog and digital specified base station transceivers for the given cell.

3. The method as in claim 1 wherein the step of determining whether the plurality of sub-frequency groups in the proposal include frequencies for use with the at least one control channel of the certain cell configuration comprises the steps of:

identifying whether the certain cell configuration specifies the use of an analog control channel; and determining whether the plurality of sub-frequency groups in the proposal include a frequency specified for use as an analog control channel.

4. The method as in claim 1 wherein the step of determining whether the plurality of sub-frequency groups in the proposal include frequencies for use with the at least one control channel of the certain cell configuration comprises the steps of:

identifying whether the certain cell configuration specifies the use of a digital control channel; and determining whether the plurality of sub-frequency groups in the proposal include a frequency specified for use as a digital control channel.

5. The method as in claim 1 further including the steps of:

assigning from the plurality of sub-frequency groups in the proposal a certain one or ones of the frequencies therein to the base station transceivers as frequencies for the at least one control channel; and assigning the remaining frequencies within the plurality of sub-frequency groups in the proposal to the base station transceivers as frequencies for traffic channels.

6. The method as in claim 5 wherein the step of assigning the remaining frequencies comprises the step of assigning the frequencies based on their top to bottom ordering within each sub-frequency group.

7. The method as in claim 5 wherein the step of assigning the remaining frequencies comprises the step of assigning the frequencies based on their bottom to top ordering within each sub-frequency group.

8. The method as in claim 5 wherein the step of assigning the remaining frequencies comprises the step of assigning the frequencies based on their least interfered to worst interfered ordering within each sub-frequency group.

9. The method as in claim 5 wherein the step of assigning the certain one or ones of the frequencies for the at least one control channel comprises the step of assigning a frequency having a specified use as an analog control channel to the base station transceiver of the certain cell configuration designated for analog control channel use.

10. The method as in claim 5 wherein the step of assigning the certain one or ones of the frequencies for the at least one control channel comprises the step of assigning a frequency having a specified use as a digital control channel to the base station transceiver of the certain cell configuration designated for digital control channel use.

11. The method as in claim 5 wherein the step of assigning the certain one or ones of the frequencies for the at least one control channel comprises the step of assigning a frequency having a digital operation authorization and being least interfered to the base station transceiver of the certain cell configuration designated for digital control channel use.

12. The method as in claim 5 wherein the given cell comprises a dual mode analog/digital cell, and the step of assigning the remaining frequencies within the plurality of sub-frequency groups comprises the step of assigning the frequencies to satisfy the certain cell configuration of analog and digital specified base station transceivers for the given cell.

13. A method for evaluating a proposal for a revision to a cellular frequency plan assignment for a given cell having a certain cell configuration of analog and digital base station transceivers, the cell configuration further specifying an analog control channel, the proposal identifying a plurality of analog, digital and/or dual mode sub-frequency groups to be used by the base station transceivers of the given cell for its operating frequencies, comprising the steps of:

determining a first sum comprising a number of the digital transceivers in the cell configuration minus a number of frequencies within the digital mode sub-frequency groups of the proposal;

determining a second sum comprising a number of the analog base station transceivers in the cell configuration minus a number of frequencies within the analog mode sub-frequency groups of the proposal;

determining a third sum comprising the sum of the first and second sums;

verifying that the third sum does not exceed a number of frequencies within the dual mode sub-frequency groups of the proposal; and validating the base station transceiver proposal if the verification is satisfied.

14. A method for evaluating a proposal for a revision to a cellular frequency plan assignment for a given cell having a certain cell configuration of analog and digital base station transceivers, the cell configuration further specifying at least one control channel, the proposal identifying a plurality of analog, digital and/or dual mode sub-frequency groups to be used by the base station transceivers of the given cell for its operating frequencies, comprising the steps of:

determining whether the cell has an analog control channel base station transceiver, and if so, assigning a frequency within the analog mode sub-frequency group designated for control channel use to the analog control channel base station transceiver;

determining whether the cell has a digital control channel base station transceiver, and if so, assigning a frequency within either the digital or dual mode sub-frequency group to the digital control channel base station transceiver;

assigning frequencies from the digital mode sub-frequency group to the digital base station transceivers;

determining whether any digital base station transceivers have not been assigned frequencies from the digital mode sub-frequency group, and if so, assigning frequencies from the dual mode sub-frequency group to those un-assigned digital base station transceivers;

assigning frequencies from the analog mode sub-frequency group to the analog base station transceivers; and determining whether any analog base station transceivers have not been assigned frequencies from the analog mode sub-frequency group, and if so, assigning frequencies from the dual mode sub-frequency group to those un-assigned analog base station transceivers.

15. The method as in claim 14 wherein the step of assigning a frequency within either the digital or dual mode sub-frequency group to the digital control channel base station transceiver comprises the step of assigning a frequency designated for use as a control channel to the digital control channel base station transceiver.

16. The method as in claim 14 wherein the step of assigning a frequency within either the digital or dual mode sub-frequency group to the digital control channel base station transceiver comprises the step of assigning a least interfered frequency to the digital control channel base station transceiver.

17. The method as in claim 14 wherein the step of assigning frequencies from the dual mode sub-frequency group to those un-assigned digital base station transceivers comprises the steps of:

determining whether analog or digital mode operation is preferred for the cell;

assigning least interfered ones of the frequencies from the dual mode sub-frequency group to those un-assigned digital base station transceivers if digital mode operation is preferred; and assigning most interfered ones of the frequencies from the dual mode sub-frequency group to those un-assigned digital base station transceivers if analog mode operation is preferred.

18. A method for evaluating network effect of a proposal for a revision to a cellular frequency plan assignment for a given cell, comprising the steps of:

maintaining a record of approved proposals of other cells for revisions to the frequency plan assignment, the record identifying for each approved proposal the other cell for which the proposal was approved, a sub-frequency group dropped by the approved proposal, and a sub-frequency group added by the approved proposal;

comparing a proposal for a revision to a frequency plan assignment for a given cell, the submitted proposal identifying the given cell, a sub-frequency group to be dropped by the proposal and a sub-frequency group to be added by the proposal to the record of approved proposals to identify potential adverse network consequences from an implementation of the proposal in view of the approved proposals; and issuing a warning regarding the proposal if potential adverse network consequences are found.

19. The method as in claim 18 wherein the step of comparing comprises the steps of:

determining if the sub-frequency group to be dropped by the proposal for the given cell is the same as the sub-frequency group added or dropped by one of the approved proposals for the other cells in the record;

calculating a distance between the given cell and the other cell in the record having the same sub-frequency group added or dropped by one of the approved proposals;

comparing the calculated distance to a threshold; and finding potential adverse network consequences if the calculated distance is less than the threshold.

20. The method as in claim 18 wherein the step of comparing comprises the steps of:

determining if the sub-frequency group to be added by the proposal for the given cell is the same as the sub-frequency group added or dropped by one of the approved proposals for another cell in the record;

calculating a distance between the given cell and the other cell in the record having the same sub-frequency group added or dropped by one of the approved proposals;

comparing the calculated distance to a threshold; and finding potential adverse network consequences if the calculated distance is less than the threshold.

21. The method as in claim 18 wherein the step of comparing comprises the steps of:

determining if the sub-frequency group to be dropped by the proposal for the given cell is adjacent to the sub-frequency group added or dropped by one of the approved proposals for the other cells in the record;

calculating a distance between the given cell and the other cell in the record having the adjacent sub-frequency group added or dropped by one of the approved proposals;

comparing the calculated distance to a threshold; and finding potential adverse network consequences if the calculated distance is less than the threshold.

22. The method as in claim 18 wherein the step of comparing comprises the steps of:

determining if the sub-frequency group to be added by the proposal for the given cell is adjacent to the sub-frequency group added or dropped by one of the approved proposals for another cell in the record;

calculating a distance between the given cell and the other cell in the record having the adjacent sub-frequency group added or dropped by one of the approved proposals;

comparing the calculated distance to a threshold; and finding potential adverse network consequences if the calculated distance is less than the threshold.

23. A method for revising a cellular frequency plan assignment for a given cell having a certain cell configuration of analog and digital base station transceivers, the cell configuration further specifying at least one control channel, comprising the steps of:

making radio environment statistics measurements useful in determining at least one reshuffling of a plurality of analog, digital and/or dual mode sub-frequency groups to be used by the base station transceivers of the given cell for its operating frequencies;

validating that the plurality of analog, digital and/or dual mode sub-frequency groups of the reshuffling include sufficient frequencies to satisfy the certain cell configuration of analog and digital base station transceivers;

assigning the frequencies of the plurality of analog, digital and/or dual mode sub-frequency groups to the analog and digital base station transceivers;

evaluating whether there is any adverse network effect to implementing the reshuffling;

verifying interference clearance of the reshuffling; and implementing the reshuffling of base station transceiver sub-frequency groups if the evaluation is negative and the interference clearance is verified.

24. The method as in claim 23 wherein the step of making radio environment statistics measurements comprises the step of measuring uplink interference on the frequencies of the plurality of analog, digital and/or dual mode sub-frequency groups.

25. The method as in claim 23 wherein the step of validating comprises the steps of:

determining whether the plurality of sub-frequency groups in the reshuffling include enough frequencies to satisfy the certain cell configuration of base station transceivers for the given cell; and determining whether the plurality of sub-frequency groups in the reshuffling include frequencies for use with the at least one control channel of the certain cell configuration.

26. The method as in claim 23 wherein the step of assigning comprises the steps of:

assigning from the plurality of sub-frequency groups in the reshuffling certain one or ones of the frequencies therein to the base station transceivers as frequencies for the at least one control channel; and assigning the remaining frequencies within the plurality of sub-frequency groups in the reshuffling to the base station transceivers as frequencies for traffic channels.

27. The method as in claim 23 wherein the step of evaluating comprises the steps of:

maintaining a record of approved reshufflings for other cells, the record identifying for each approved reshuffling the other cell for which the reshuffling was approved, a sub-frequency group dropped by the approved reshuffling, and a sub-frequency group added by the approved reshuffling;

comparing the reshuffling for a given cell to the record of approved reshufflings to identify potential adverse network consequences from an implementation of the reshuffling in view of the approved reshufflings; and issuing a warning regarding the reshuffling if potential adverse network consequences are found.

28. The method as in claim 27 wherein the step of comparing comprises the steps of:

determining whether a sub-frequency group added or dropped by the reshuffling for the given cell matches or is adjacent to a sub-frequency group added or dropped by the approved reshufflings for the other cells;

calculating a distance between the given cell and the other cell in the record having the matching or adjacent sub-frequency groups;

comparing the calculated distance to a threshold; and finding potential adverse network consequences if the calculated distance is less than the threshold.

29. The method as in claim 23 wherein the step of verifying comprises the step of measuring downlink interference on the frequencies of the plurality of analog, digital and/or dual mode sub-frequency groups within the reshuffling.

* * * * *